Jan. 6, 1931.  P. J. SHRUM  1,788,253
THREAD PROTECTOR
Filed Oct. 29, 1927
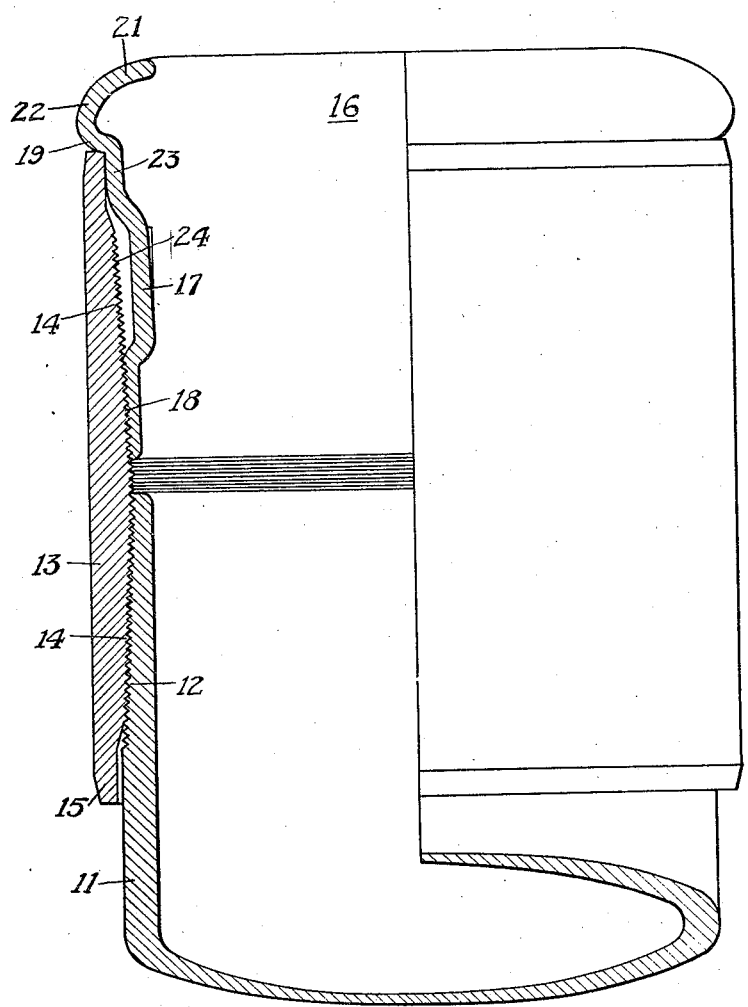
INVENTOR.
Peter J. Shrum
BY Green & McCallister
ATTORNEYS.

Patented Jan. 6, 1931

1,788,253

UNITED STATES PATENT OFFICE

PETER J. SHRUM, OF MONACA HEIGHTS, PENNSYLVANIA, ASSIGNOR TO PITTSBURGH SCREW AND BOLT CORPORATION, A CORPORATION OF PENNSYLVANIA

THREAD PROTECTOR

Application filed October 29, 1927. Serial No. 229,600.

This invention relates to improvement in internal thread protectors and more particularly to those for use in connection with internal threads on couplings for tubes, pipes and the like.

It is customary in shipping internally threaded couplings to protect the ends of the coupling and the threads therein, by screwing a thread protector into the coupling ends. The protector not only stiffens the coupling, but prevents injury to the coupling ends as well as protecting the threads from damage and dirt. Often times pipes and couplings are shipped in open cars and during their transit from one place to another, they are subject to various weather conditions, such as rain and moisture which causes the threads to corrode or rust and often times the ends of such couplings or pipes are provided with the thread protectors that have heretofore been provided, which permits moisture, rain and the like access to the threads and in many instances, damages the threads to a great extent.

One object of this invention is to provide an improved thread protector for use with couplings which are so constructed as to offer a special protection to the end portions of the coupling upon which they are used.

Another object of this invention is to provide an improved thread protector for use with internally threaded couplings which are so constructed as to provide space between the thread protector and the internal threads of the coupling for containing a lubricant.

A further object of this invention is to provide a thread protector constructed in such a manner as to form a lubricant chamber between such thread protectors and the threads of the coupling or pipe to be protected, the ends of such protectors being adapted to cooperate with the coupling in such a manner as to prevent leakage of the oil contained there-between.

Referring to the drawing, the single view illustrates partly in elevation and partly in section, a protector embodying this invention, applied to a coupling having internal threads, the other end of the coupling being attached to a pipe.

In the construction shown, 11 represents the end portion of a pipe having external tapered threads 12 cut therein. 13 is a coupling having internal tapered threads 14 for engaging and cooperating with the threads 12 of the pipe 11. The threads 14 of the coupling 13 taper outwardly towards the ends of the coupling, for the obvious reason of coupling together two such pipe ends as 11. The coupling is also provided with a tapered skirt portion 15 at its ends to protect threads as well as the vanishing threads of the pipes and aids in placing the coupling on the end of the pipe.

The thread protector embodying this invention which is represented in its entirety by 16, is formed from a section of tubing in such manner as to provide a body portion 17 which is arcuate in shape. The inner or smaller end of the protector 16 is provided with an externally tapered threaded portion 18, adapted to mesh with the threads 14 of the coupling.

The outer or large end of the protector terminates in an outwardly extending annular flange 19 having a re-entrant portion 21 spaced from the flange 19 and over-lying the same, forming a curved wall 22 therebetween. Adjacent the flange portion 19, the protector is provided with a tapered portion 23 having an external diameter substantially the same as the internal diameter of the tapered skirt portion 15 of the coupling. The portion 23 of the protector is adapted to engage the inner portion of the skirt 15 as the protector is placed in position in the coupling forming an oil tight connection between the portion 23 and the skirt portion 15, and likewise the corresponding threaded portions of the protector and coupling form an oil tight connection.

The diameter of the center body portion 17 is less than the diameter of any other portion of the protector 16 and thereby forms a space 24 between the outer surface of the protector 16 and the threads 14 of the coupling 13. The space 24 is employed for containing a lubricant for protecting the threads 14 of the coupling 13 from corrosion or rust and otherwise preserving threads and maintaining them in readily operable condition.

When it is desired to ship couplings 13 separately from pipes, a thread protector 16 is provided for each end of the couplings.

By providing the lubricant chamber or space 24, a great advantage is added to this particular art, as it is well known that the protectors heretofore provided, permit rain and moisture access to the threads for which protection is desired, causing deterioration of the threads. By providing a lubricant chamber 24, the threads are at all times lubricated and thoroughly protected from adverse weather conditions as well as from dirt and injury through handling.

Another important advantage of the present protector is that the number of threads required on the protector are reduced to a minimum and thereby rendering the protector less expensive to manufacture. The portions 19, 21, 22 and 23 serve to strengthen and protect the end of the coupling or pipe to which the protector may be employed in a manner well known in the art.

While I have illustrated and described but one embodiment of this invention it will be apparent to those skilled in the art that certain changes, modifications, substitutions, additions and omissions may be made in the protector without departing from the spirit and scope of the appended claim.

Having thus described my invention, what I claim and desire to secure by Letters Patent is:

A thread protector comprising an externally threaded annular end portion, an annular countersunk intermediate portion of less diameter than said threaded portion, an annular end portion having an abrupt shoulder formed thereon of greater diameter than said threaded portion and terminating in an annular re-entrant flange having a minimum diameter less than the external diameter of said threaded portion, and an annular tapering portion between said countersunk and last mentioned annular end portions.

In testimony whereof, I have hereunto subscribed my name this 26th day of October, 1927.

PETER J. SHRUM.